United States Patent [19]
Weidenfeller et al.

[11] Patent Number: 6,028,602
[45] Date of Patent: *Feb. 22, 2000

[54] METHOD FOR MANAGING CONTENTS OF A HIERARCHICAL DATA MODEL

[75] Inventors: Thomas Weidenfeller, Aachen; Torsten Schumacher, Wuerselen, both of Germany

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/865,998

[22] Filed: May 30, 1997

[51] Int. Cl.[7] .............................. G06F 13/00; G06F 3/14

[52] U.S. Cl. ..................... 345/340; 345/356; 345/357; 345/968

[58] Field of Search ........................... 345/146, 326, 345/356, 357, 968; 707/102, 103

[56] References Cited

U.S. PATENT DOCUMENTS

| | | | |
|---|---|---|---|
| 5,504,853 | 4/1996 | Schuur et al. | 345/356 |
| 5,644,736 | 7/1997 | Healy et al. | 345/357 X |
| 5,701,137 | 12/1997 | Kiernan et al. | 345/356 X |
| 5,714,971 | 2/1998 | Shalit et al. | 345/340 X |

FOREIGN PATENT DOCUMENTS

| | | |
|---|---|---|
| 04 205141 | 7/1992 | European Pat. Off. . |
| 0 690 367 A1 | 1/1996 | European Pat. Off. . |

OTHER PUBLICATIONS

Master Windows 3.1, Special Edition, pp. 121–123, 1992.
"Mastering Windows 3.1", Sybex, 1992, pp. 105,–143, 1992.
BTS Configuration Management (BCM), TMOS User Guide, pp. 1–87.
ITU–T X.720/Corr.1 (Feb. 1994), Technical Corrigendum 1, Data Communication Networks, International Telecommunication Union, Information Technology–Open Systems Interconnection–Structure of Management Information: Management Information Model, pp. 1–2.
CCITT X.700 (Sep. 1992), Data Communication Networks, International Telecommunication Union, Management Framework for Open Systems Interconnection (OSI) for CCITT Applications, pp. 1–11.
CCITT X.720 (Jan. 1992), Data Communication Networks, International Telecommunication Union, Information Technology–Open Systems Interconnection–Structure of Management Information: Management Information Model, pp. 1–28.
ITU–T Amendment 1 X.720 (Nov. 1995), Data Networks and Open System Communications, OSI Management, International Telecommunication Union, Information Technology–Open Systems Interconnection–Structure of Management Information: Management Information Model, pp. 1–2.

(List continued on next page.)

*Primary Examiner*—Raymond J. Bayerl
*Assistant Examiner*—Chadwick A. Jackson
*Attorney, Agent, or Firm*—Burns, Doane, Swecker & mathis, L.L.P.

[57] ABSTRACT

A graphical user interface includes at least one primary window that displays the contents of a hierarchical data model as a hierarchical tree. A secondary window is displayed which contains a subset of the contents, e.g., groupings based on search criteria, of the hierarchical data model as a flat-list. The primary window and the secondary window are displayed on a screen at the same time so that a user can see both the hierarchical relationship and specific groupings of the contents of the hierarchical data model. Several synchronization mechanisms between the primary window and the secondary window are provided. For example, a user can select an element of the flat-list in the secondary window and cause the display of the primary window to correspond to the user's selection of the element. In addition, multiple selected elements from the secondary window can be copied back to the primary window such that a common operation can be performed on the multiple selected elements.

46 Claims, 11 Drawing Sheets

OTHER PUBLICATIONS

ITU–T Amendment 1 X.701 (Apr. 1995), Data Networks and Open System Communications, OSI Management, International Telecommunication Union, Information Technology–Open Systems Interconnection–Systems Management Overview, p. 1.

ITU–T Corrigendum 2 X.701 (Apr. 1995), Data Networks and Open System Communications, OSI Management, International Telecommunication Union, Information Technology–Open Systems Interconnection–Systems Management Overview, pp. 1–2.

ITU–T X.701/Corr.1 (Feb. 1994), Technical Corrigendum 1, Data Communication Networks, International Telecommunication Union, Information Technology–Open Systems Interconnection–Systems Management Overview, p. 1.

CCITT X.701, Data Communication Networks, International Telecommunication Union, Information Technology–Open Systems Interconnection–Systems Management Overview, pp. 1–25.

ITU–T X.701 Corrigendum 3 (Oct. 1996), Series X: Data Networks and Open System Communication, OSI Management, International Telecommunication Union, Information Technology–Open Systems Interconnection–Systems Management Overview, p. 1.

Wolfgang Pree, "Design Patterns for Object–Oriented Software Development," Addison–Wesley, 1995, pp. 69–70.

Frank Buschmann, et al., "A System of Patterns," Chichester, West Sussex, John Wiley & Sons, 1996, pp. 125–143.

CNA User Guide, 1553–CRA 114 075 Uen Rev PC1 1995–08–02, PP. 7, 20, 25–30 AND 37.

AXS User Guide, 1553–CRA 114 221 Uen Rev PB4 1995–11–16, pp. 8 and 10–11.

Johnson, "Netware for the Enterprise, Take Two", 8178 Data Communications, vol. 24, No. 2, Feb. 1, 1995, pp. 45/46.

Shneiderman et al., "Display Strategies for Program Browsing: Concepts and Experiment", 8218 IEEE Software, vol. 3, No. 3, May 1986, pp. 7–15.

Fowler et al., "Integrating Query, Thesaurus, and Documents through a Common Visual Representation", Proceedings of the Annual International ACM/SIGIR Conference on Research and Development in Information Retrieval, Chicago, Oct. 13–16, 1991, pp. 142–151.

Salvador et al., "A Task–Based, Graphical User Interface for Network Management", Proceedings of the Network Operations and Management Symposium, vol. 2 of 3, Feb. 14, 1994, IEEE, pp. 681–690.

Henninger, "Retrieving Software Objects in an Example–Based Programming Environment", Proceedings of the Annual International ACM/SIGIR Conference on Research and Development in Information Retrieval, Chicago, Oct. 13–16, 1991, pp. 251–160.

METHOD FOR MANAGING CONTENTS OF A HIERARCHICAL DATA MODEL

BACKGROUND

The present invention relates generally to graphical user interfaces which can, for example, be used in the management of telecommunication network systems. More particularly, the present invention relates to methods and systems for using graphical user interfaces to browse management information, e.g., information regarding the structure of a managed telecommunication network.

Graphical user interfaces are now being used instead of the traditional command-oriented, man/machine language for the management of telecommunication networks. These graphical user interfaces are characterized by the presentation of information in windows, as well as user control by a pointing device such as a mouse. The operation of these graphical user interfaces in such an environment can be described as "select-then-operate," i.e., a user first selects a managed object from the interface and then indicates the desired operation for that object.

In the context of a managed telecommunication network, a graphical user interface shows graphical representations of managed telecommunication objects, e.g., base station transmitters, in windows and allows the selection (highlighting) of the managed objects for use in a specified operation. Managed objects, per se, are described in CCITT Rec. X.700 ("Management Framework for OSI") and X.701 ("OSI—Systems Management Overview"), the contents of which are incorporated here by reference in their entireties. The principles for naming and identifying managed objects are further described in CCITT Rec. X.720 ("Structure of Management Information. Part 1: Management Information Model"), the content of which is incorporated here by reference in its entirety. Actual instances of managed objects are identified by a naming attribute and structured in a naming hierarchy. The naming hierarchy is also called the naming tree, e.g., FIG. 4, because it structures the management information by providing an "is contained in" relationship between the managed objects.

Actual telecommunication network systems typically include thousands of managed objects and it is extremely difficult and impractical to display all of the managed objects simultaneously in a graphical user interface. Easy access to this information is important for management tasks like regular maintenance, trouble shooting, and reconfiguration of the network. In addition to techniques (e.g., scrolling, expanding/compressing, and listing only on a selected level) for coping with the large number of managed objects, the present invention also provides a new way of handling managed objects especially suited for, but not limited to, the above-described telecommunication application.

Figure 1:
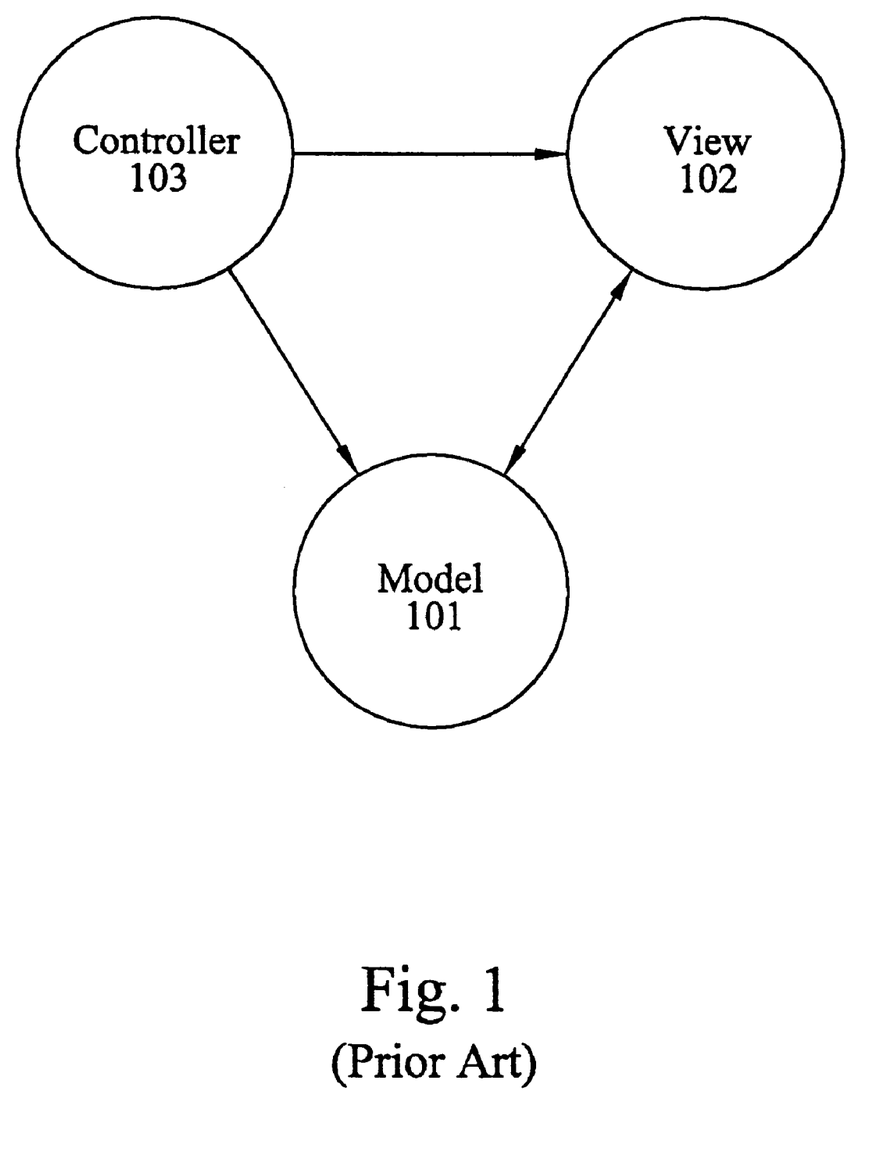
FIG. 1 is a block level representation of the conventional model-controller-view principle.

Graphical user interfaces built according to object oriented principles are typically viewed as including V three components: the model, the view, and the controller. The model-view-controller (MVC) concept originates from a Smalltalk class-library as described in *Design Patterns for Object-Oriented Software Development* written by Wolfgang Pree, Addison-Wesley, 1995 and *A System of Patterns* written by Frank Buschmann et al., Chichester, West Sussex, John Wiley & Sons, 1996, the contents of which are incorporated here by reference in their entireties. As illustrated in FIG. 1, the model 101 stores application-specific data, e.g., a text processing application stores text characters in the model 101; a drawing application stores a description of different graphical shapes in the model 101; and a managed object management system stores a managed object naming tree and data relating to the managed objects in the model 101. A view 102 presents the model 101 on a display, e.g., a screen. Any number of views might present the model 101 in different ways although each view 102 accesses the information stored in the model 101. The controller 103 handles input events such as mouse interaction and key strokes of a keyboard. The controller 103 can access the view 102 as well as the model 101 to make changes to both the model 101 and the view 102.

Currently, navigating through and performing operations on a managed object tree in a graphical user interface is accomplished using one of two different techniques. The first technique involves displaying a selected hierarchy level in a flat list, i.e., a scrollable non-hierarchical list. The second method involves displaying a tree list, i.e., a hierarchical representation of the managed objects having nodes and branches of nodes and having controls to expand and compress individual levels of the tree list.

Figure 2:
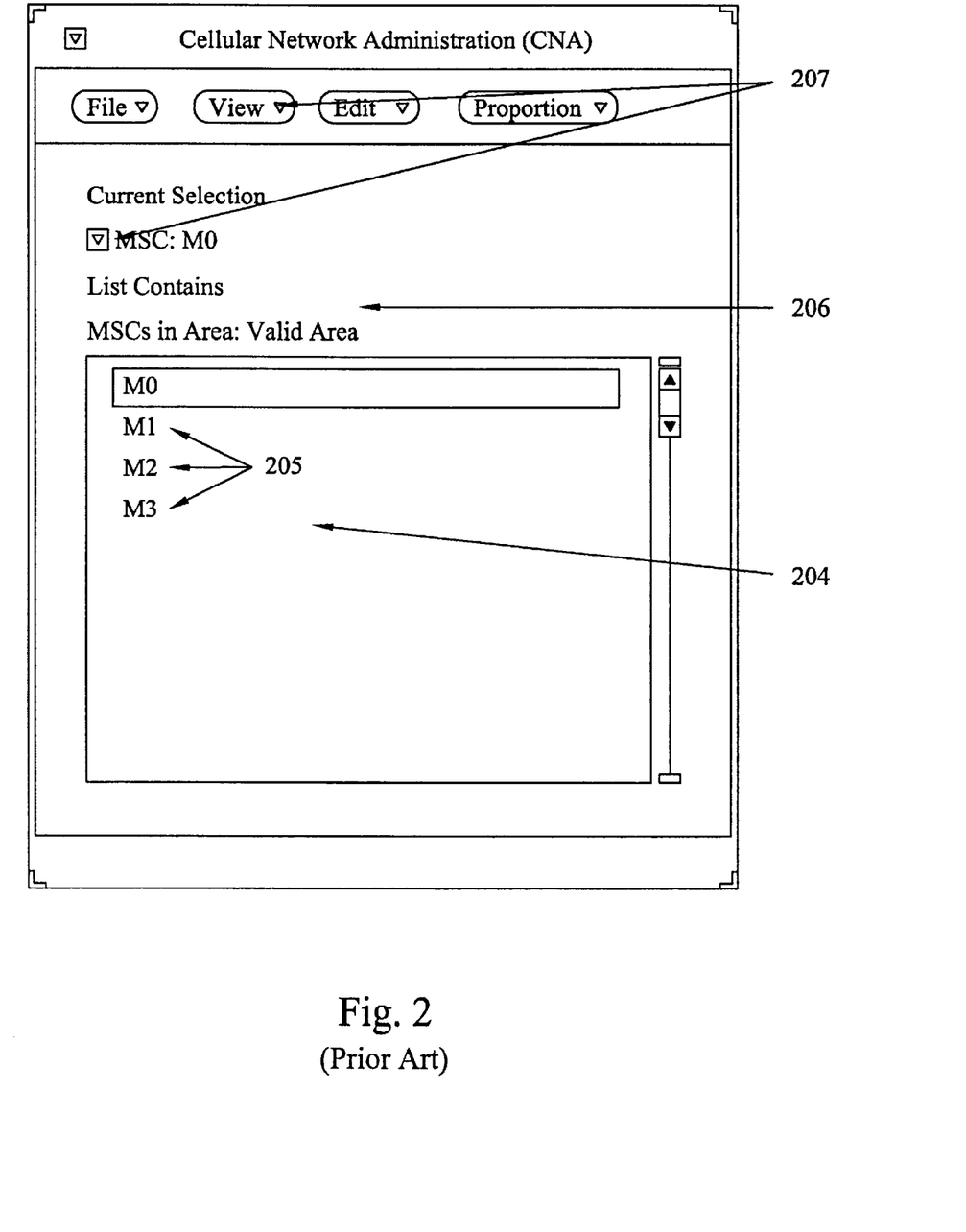
FIG. 2 is a pictorial view of a conventional user interface window using the flat-list method.

An example of the conventional flat list method can be found in the "CNA User Guide," 1553-CRA 114 075 Uen Rev PC1 Aug. 2, 1995. With reference to FIG. 2, this conventional flat-list method uses a non-hierarchical list 204 to graphically depict a selected number of managed objects 205. This list 204 is normally accompanied by a text description 206 which describes the selection criteria for the list 204. In addition, controls 207, e.g., a menu, are provided in order to enable a user to change the selection criteria.

However, presentation of managed objects using a flat-list does not provide the user with an overview of the hierarchical relationship between the various managed objects. Knowledge of this hierarchical relationship is necessary to provide a unique identification of each of the managed objects. This problem is especially acute for flat-lists created using display criteria other than object hierarchy, e.g., a flat-list showing all managed objects that are geographically proximate to a given managed object. For example, the geographically proximate managed objects may have different parent managed objects and information about those parent objects is necessary to provide unique identities.

Current systems solve this problem by presenting the name of the parent object(s) within the same row of the flat-list. This solution still has the drawback in a "select-then-operate" user interface that the parent object(s) can not be selected, hence no operation can be performed on those objects directly.

Figure 3:
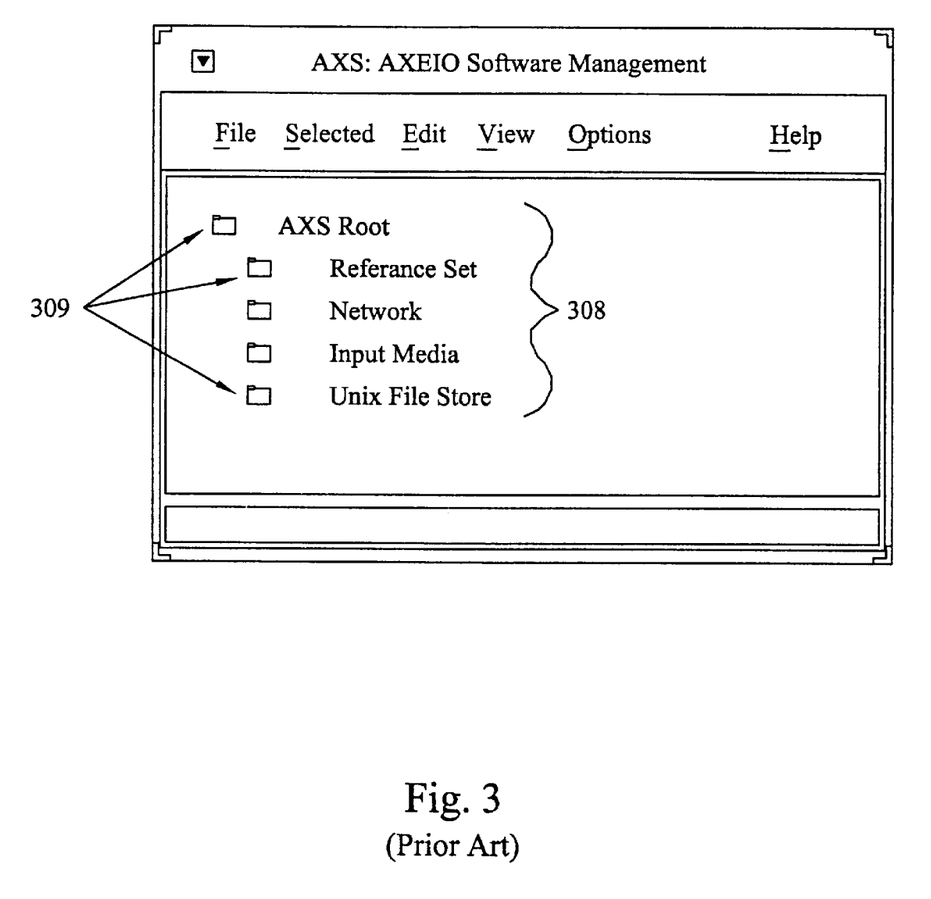
FIG. 3 is a pictorial view of another conventional user interface window using the tree-list method.

The tree-list method is a more intuitive technique for graphically depicting managed objects, because this method inherently provides an overview of the object hierarchy to the user. An example of the tree-list method can be found in the "AXS User Guide," 1553-CRA 114 221 Uen Rev PB4 Nov. 16, 1995. As illustrated in FIG. 3, the managed object tree is presented as a list 308 where hierarchical levels are indicated by indenting individual rows. A user can step through the hierarchy by expanding or collapsing individual hierarchical levels by selecting a folder icon 309 at the left side of each row.

One disadvantage of the tree-list method is that it does not allow for the grouping of managed objects together. Managed objects having some common criteria might nonetheless be displayed far away from each other on the tree-list due to the fixed hierarchical arrangement in the tree-list. For example, displaying all managed objects that are geographically proximate to a given managed object may not be possible within the boundaries of a single window, because the geographically proximate managed objects may be separated by several rows of other managed objects and thus the list may be too long to be displayed without having to scroll through the contents of the window.

Therefore, a new technique and system for navigating through, and performing operations on, a managed object tree in a graphical user interface is needed to overcome the problems of both the flat-list and tree-list methods. This new technique should provide the capability to both display the user's selected object (i.e., the managed object to be operated on) within the context of its hierarchy and also display related managed objects defined by user specified criteria.

SUMMARY

The present invention relates to a graphical user interface which includes at least one primary window (tree browser window) which displays the contents of a hierarchical data model as a hierarchical tree. A secondary window (bucket window) is displayed which contains a subset of the contents, i.e., groupings based on search criteria, of the hierarchical data model as a flat-list. The primary window and the secondary window are displayed on a screen at the same time so that a user can see both the hierarchical relationship and specific groupings of the contents of the hierarchical data model.

Several synchronization mechanisms between the primary window and the secondary window are provided. For example, a user can select an element of the flat-list in the secondary window and cause the display of the primary window to correspond to the user's selection of the element. In addition, multiple selected elements from the secondary window can be copied back to the primary window such that a common operation can be performed on the multiple selected elements.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 4:
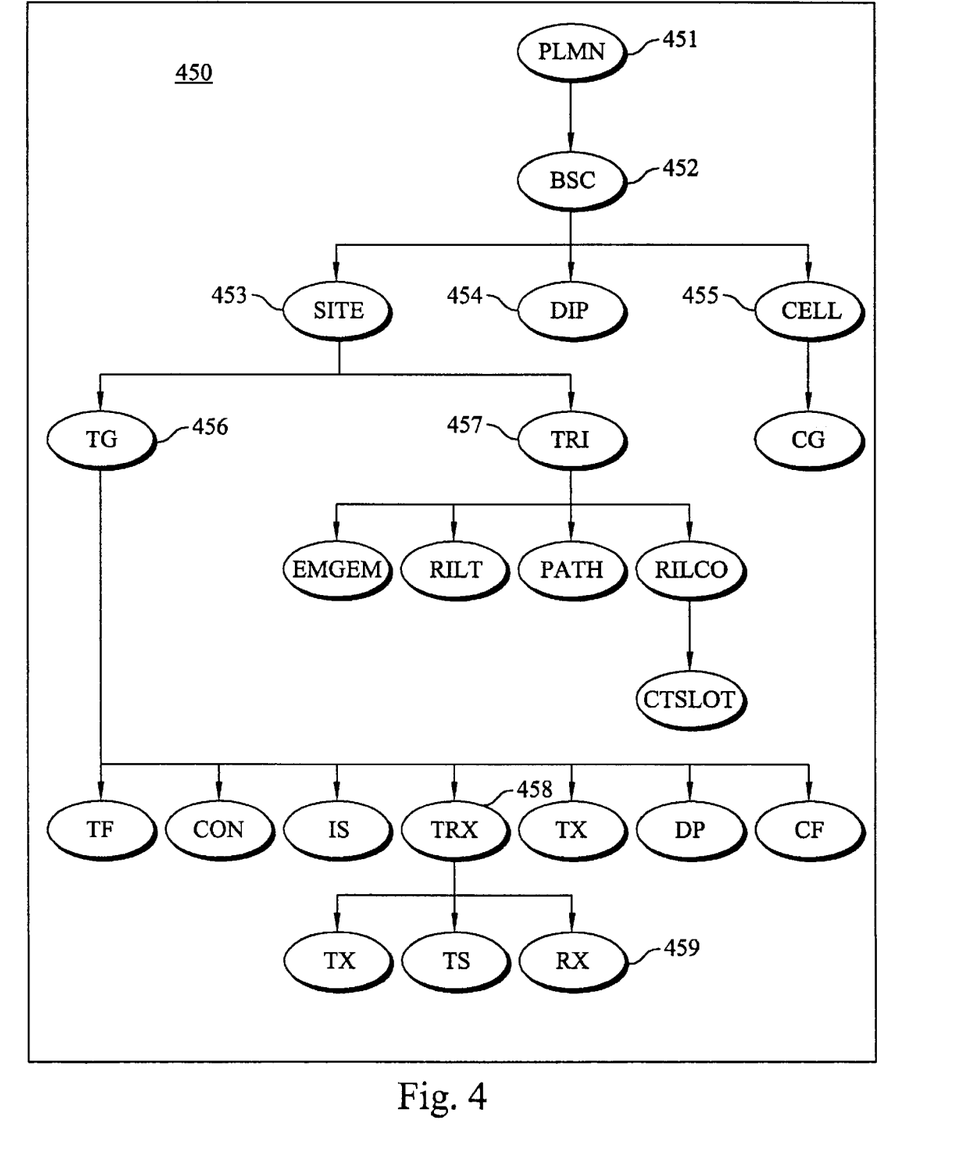
FIG. 4 is a block level hierarchical representation of the structure of a managed object tree data model, i.e., a managed object naming tree, according to an exemplary embodiment of the present invention.

FIG. 4 illustrates the an exemplary managed object naming tree 450, i.e., the structure of a managed object tree data model. While the exemplary embodiments described below refer to managed objects, it will be understood by those skilled in the art that other commonly known data types such as strings, directories, hierarchical database contents, class structures of an object oriented program, family trees, parse trees, containment relationships between elements, etc., may be implemented as elements of the naming tree of the present invention.

Figure 7:
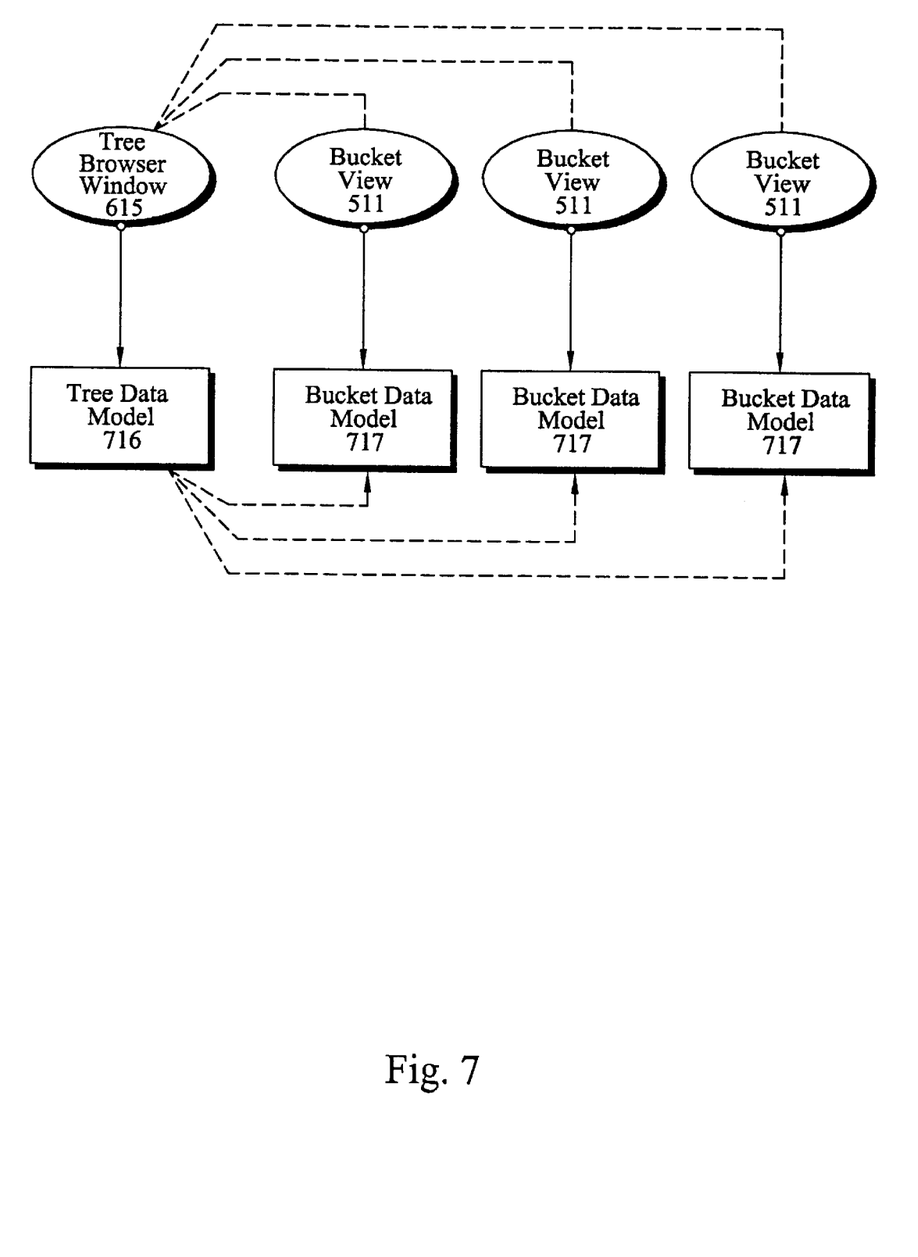
FIG. 7 is a block level representation of an abstract level of the data models and view entities according to an exemplary embodiment of the present invention.

A managed object tree data model 716, illustrated in FIG. 7, holds the tree data which will be accessed and displayed to the user of a specific application. The naming tree 450 describes the logical or physical containment relationships of the managed objects in the managed object tree data model 716.

By way of example, the structure of a managed object tree data model for a telecommunication management system application is illustrated in FIG. 4. The acronyms found in FIG. 4 are defined in Table 1, below.

TABLE I

| | |
|---|---|
| PLMN | Public Land Mobile Network |
| BSC | Base Station Controller |
| SITE | Site |
| DIP | Digital Path |
| CELL | Cell |
| TG | Transceiver Group |
| TRI | Transceiver Remote Interface |
| EMGEM | Extension Module Group Extension Module |
| RILT | Radio Interface Line Terminal |
| PATH | (Semipermanent) Path |
| RILCO | Radio Interface LAPD Concentrator (where LAPD is Link Access Protocol D) |
| CTSLOT | Concentrated Time Slot |
| TF | Timing Function |
| CON | Concentrator |
| IS | Interface Switch |
| TRX | Transceiver |
| TX | Transmitter |
| DP | Digital Path MO |
| CF | Central Function |
| TS | Time Slot RX Receiver |

In this embodiment, the root node is of type Public Land Mobile Network (PLMN) 451. The PLMN 451 node contains one child node of type Base Station Controller (BSC) 452. The Base Station Controller (BSC) has three children nodes: Site (SITE) 453; Digital Path (DIP) 454; and Cell (CELL) 455. The children nodes of the SITE node 453 are Transceiver Group (TG) 456 and Transceiver Remote Interface (TRI) 457. TG 456 contains seven children nodes including Transceiver (TRX) 458. TRX 458 contains three children including Receiver (RX) 459.

Before describing the particular features of an exemplary graphical user interface according to the present invention, various terms will be discussed as a general overview.

Figure 5:
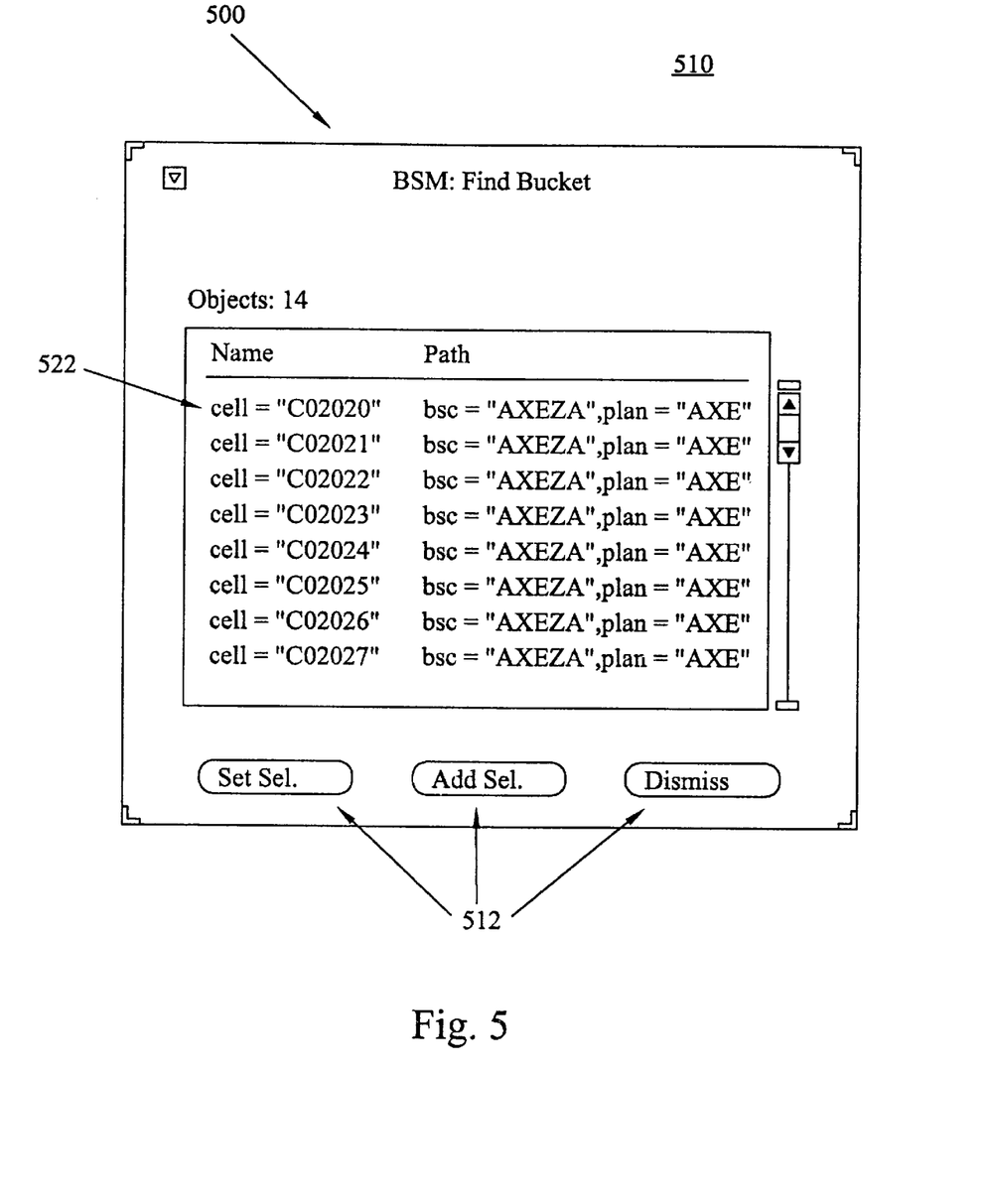
FIG. 5 is a pictorial view of a user interface window showing the elements of a bucket according to an exemplary embodiment of the present invention.

Referring to FIG. 5, a bucket 510 includes a bucket data model 717 (shown in FIG. 7), a bucket view 511, and bucket controls 512, according to the above-described model-view-controller (MVC) principle. A bucket data model 717, also called a bucket model, is a set of data, e.g., a subset of the managed object tree data model, to be displayed. The bucket view 511 provides the needed visual representation of the contents (i.e., managed objects 522) of the bucket data model 717 to the user as strings, icons, or other known graphical representations. Bucket controls 512 are the interactive elements displayed in the bucket view 511, e.g., buttons, scrollbars, etc., which permit the user to change the contents of the bucket view 511 or indicate some other action as will be described below. The display of the visible components of the bucket containing both the bucket view 511 and the bucket controls is called a bucket window 500.

Figure 6:
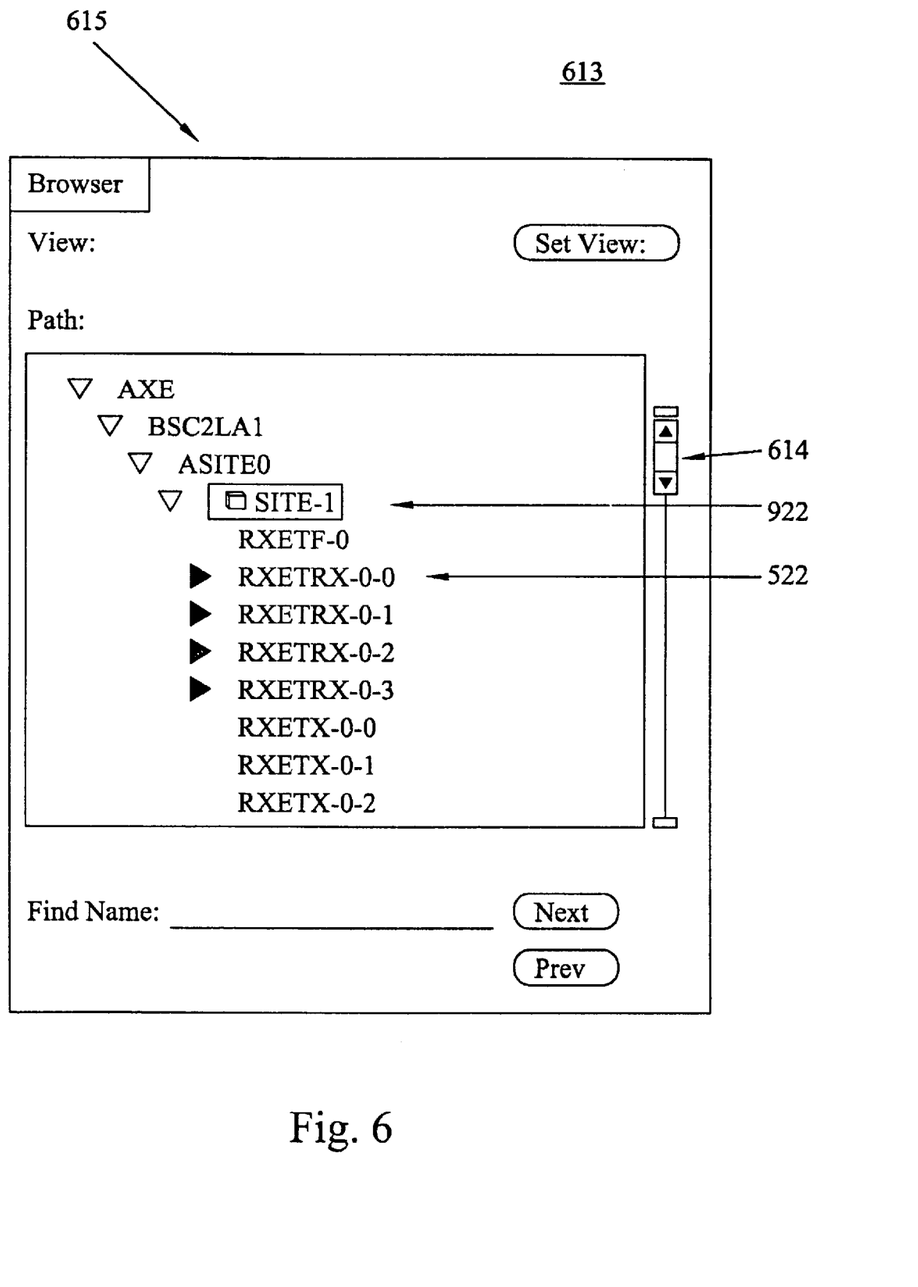
FIG. 6 is a pictorial view of a user interface window showing a tree browser according to an exemplary embodiment of the present invention.

As shown in FIG. 6, the tree browser 613 displays in a tree browser window 615, a hierarchical view of the managed object tree data model 716 (shown in FIG. 7). That is, this tree browser window 615 displays the contents of the managed object tree data model 716 as a hierarchical tree. Scrollbars 614 are provided for the user to scroll up and down the display, since the entire tree may not fit within the available display area of the tree browser window 615. A data input area is provided at the bottom of the tree browser window 615 to allow a user to enter an object name, whereupon the tree browser 613 can search for various instances of that object within the tree using known techniques.

Referring now to both FIG. 5 and FIG. 6, the bucket views 511 and tree browser window 615 of the present invention are both created in accordance with the above-described MVC concept. i.e., the visual representation (view) and the actual data (model) are separated, while the visual representation (view) accesses the actual data (model) and displays its contents. Controls are provided to manipulate the view and model.

The present invention addresses the aforementioned problems of the existing systems by, among other things, combining the tree-list method with the flat-list method. Accordingly, a tree browser window 615 is used in conjunction with a plurality of bucket windows 500. The tree browser window 615 and the bucket windows 500 are coupled by several synchronization mechanisms which are described below. By combining the tree-list method with the flat-list method along with the synchronization mechanisms, the advantages of each display method are achieved while avoiding each of the disadvantages mentioned above.

FIG. 7 illustrates the relationships between the abstract model and view entities according to the present invention. Therein, a managed object tree data model 716, holds the tree data which will be displayed to the user. The tree browser 613 accesses the tree data model 716, displays in the tree browser window 615 the objects in their stored hierarchy and allows browsing of the tree data in conjunction with the controls 614. A plurality of bucket data models 717 hold information specifically selected (as described in more detail below) from the tree data model, i.e., each bucket data model is a subset of the tree data model. A plurality of bucket views 511 access the contents of their corresponding bucket data models 717 and display the content of the bucket data model 717 in a bucket view 511 in a bucket window 500 allowing list-scrolling, selection (highlighting), and management operations. The visualization mechanism used by the bucket view 511 is that of a scrollable list as opposed to the hierarchical tree structure display of the tree browser window 615.

The bucket data model 717 is a subset of the tree data model 716, individually created for each bucket 510. As a result, each bucket 510 with an own, associated bucket view 511 is (after creation of the bucket model data 717) independent from the tree data model 716 and from all other buckets 510 already in existence.

However, from a logical point of view, the plurality of bucket views 511 and the tree browser window 615 form a set of related views, i.e., displaying different aspects (in different ways) of the same information. The buckets 510 contain snapshots of the tree data model 716 at a given time (the creation time of the bucket data models 717), while the tree browser 613 via the tree browser window 615 displays the information as is currently contained in the tree data model 716. The tree browser 613 exists during the entire lifetime of the application, while the individual buckets 510 with their data models 717 and bucket views 511 are created and destroyed on demand. In addition, bucket data models 717 may be saved or stored on a file system, database, or any other type of secondary storage medium by the user for later retrieval. Further, an individual bucket 510 containing a bucket view 511 can be split into multiple buckets 510 and multiple bucket views 511. In addition, buckets 510 can be merged so that multiple buckets 510 can be condensed into a single or fewer buckets.

Note that, according to the present invention, there are individual bucket data models 717 for each bucket 510 rather than having the bucket 510 reference the tree data model 716. Individual bucket data models 717 are advantageous since they are each independent from one another and each bucket data model 717 can represent different results as a function of time. In addition, a user may experience higher performance of the user's application since each bucket data model 717 will most likely be smaller than the tree data model 716. In addition, individual bucket data models 717 are advantageous because they allow a user to set aside a bucket 510 for later use.

Figure 8:
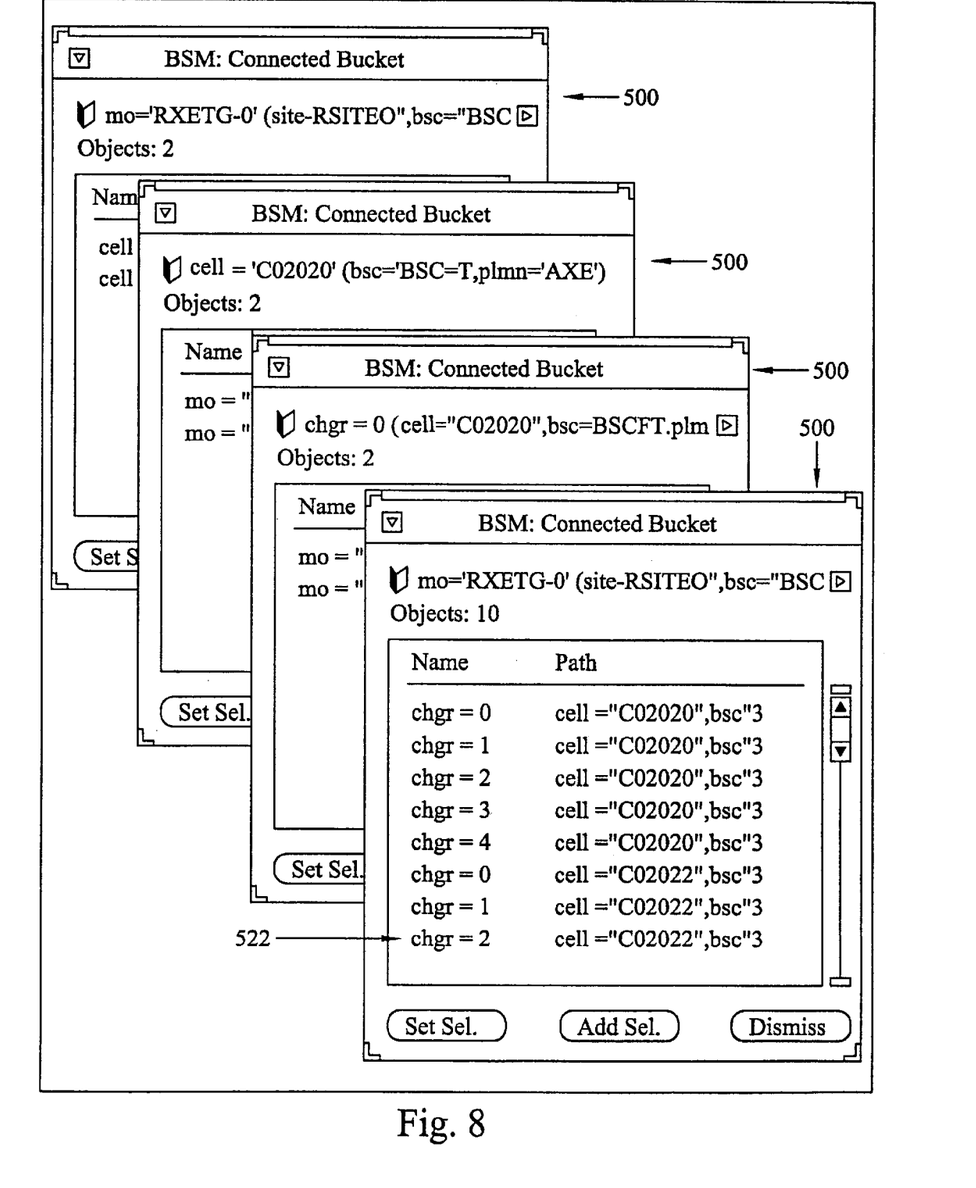
FIG. 8 is a pictorial view of multiple user interface windows showing multiple buckets according to an exemplary embodiment of the present invention.
Figure 9:
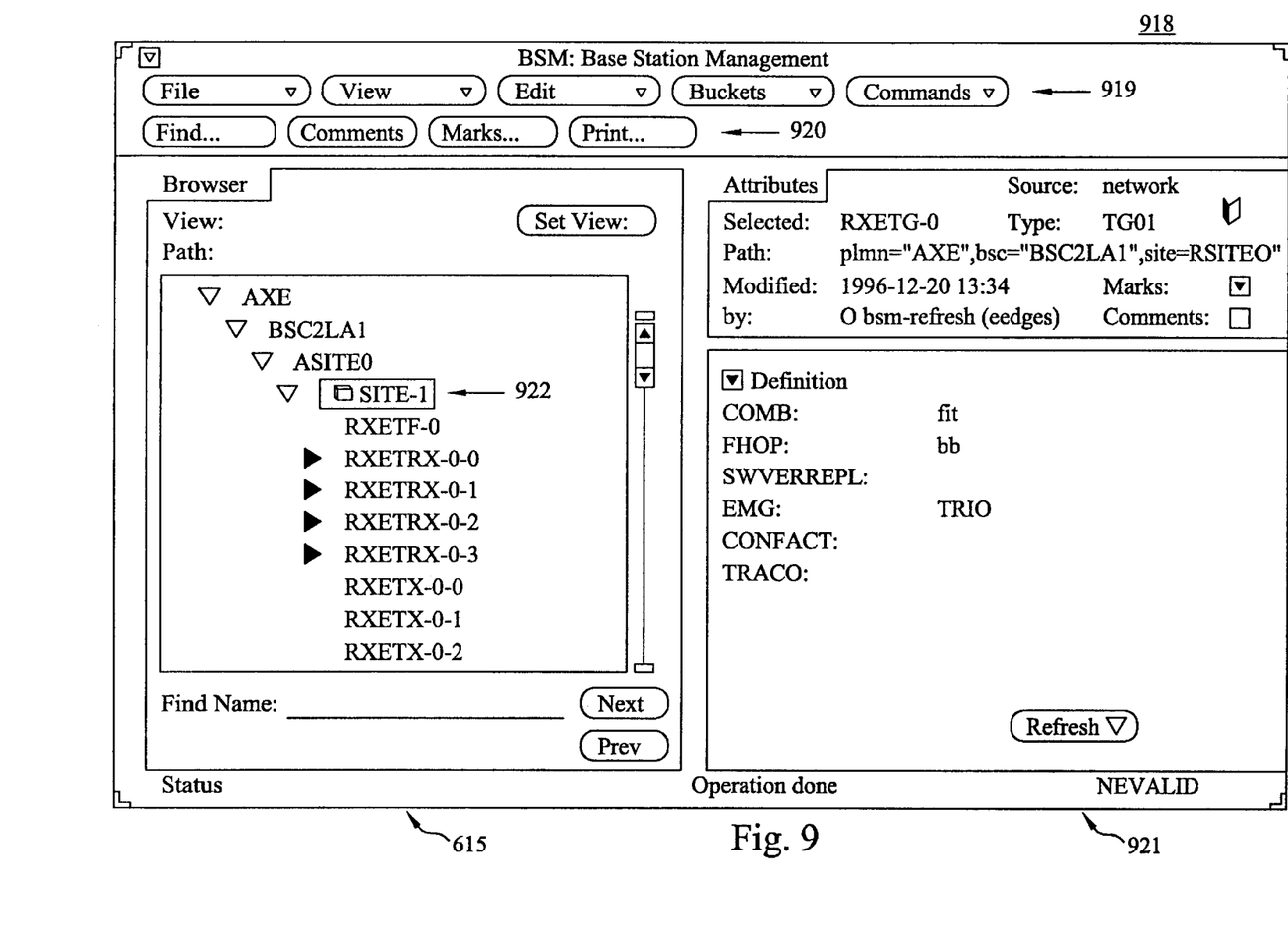
FIG. 9 is a pictorial view of the main user interface window according to an exemplary embodiment of the present invention.
Figure 11:
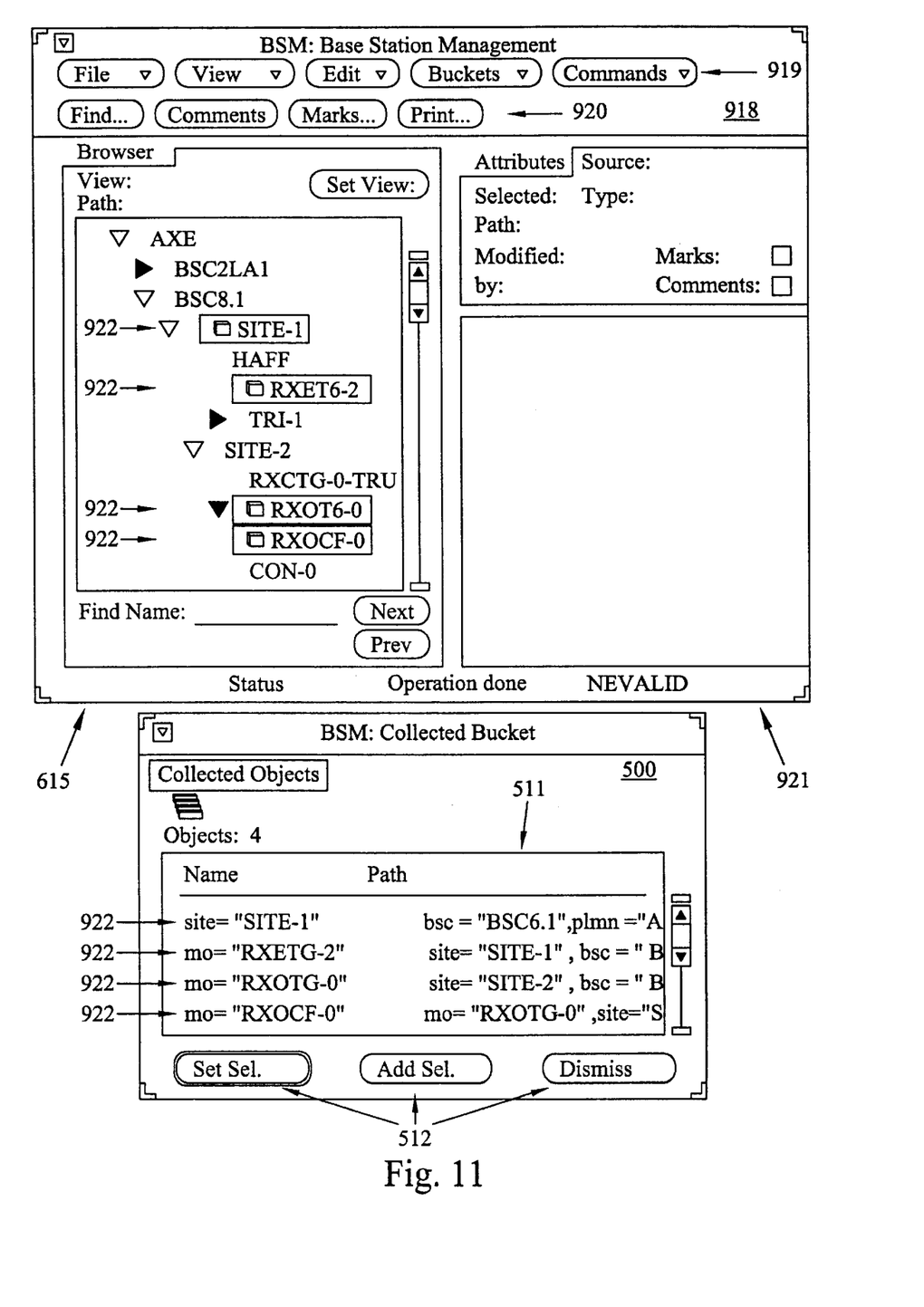
FIG. 11 is a pictorial view of a dual display of the main user interface window and a bucket window according to an exemplary embodiment of the present invention.

In an exemplary embodiment of the present invention, the elements of a bucket 510 are displayed as individual bucket windows 500 as illustrated in FIG. 8, while the tree browser window 615 is contained within a primary window 918 as illustrated in FIG. 9. Primary window 918 also contains a menu bar 919, a tool bar 920, and an attribute display 921. The menu bar contains the menu functions, e.g., "File," "View," "Edit," etc., for a specific application. The tool bar 920 contains user selectable buttons for fast and easy access to frequently used operations, e.g., "Find," "Print," etc. The attribute display 921 allows the user to view relevant information pertaining to a selected (highlighted) managed object 922 in the tree browser window 615. FIG. 11 illustrates the dual display of the primary window 918 and a bucket window 500. Alternatively, bucket window 500 and tree browser window 615 can be displayed to the user without the primary window 918. Alternatively, the tree browser window 615, the bucket windows 500, and the attribute display 921 may each be contained in their own individual windows. Also, any two of the above, or all three of the above displays may be contained in a single window. In addition, the menu bar 919 and the tool bar 920, may each displayed as their own separate windows, or be combined with themselves or any of the other windows which are displayed to the user.

Figure 10:
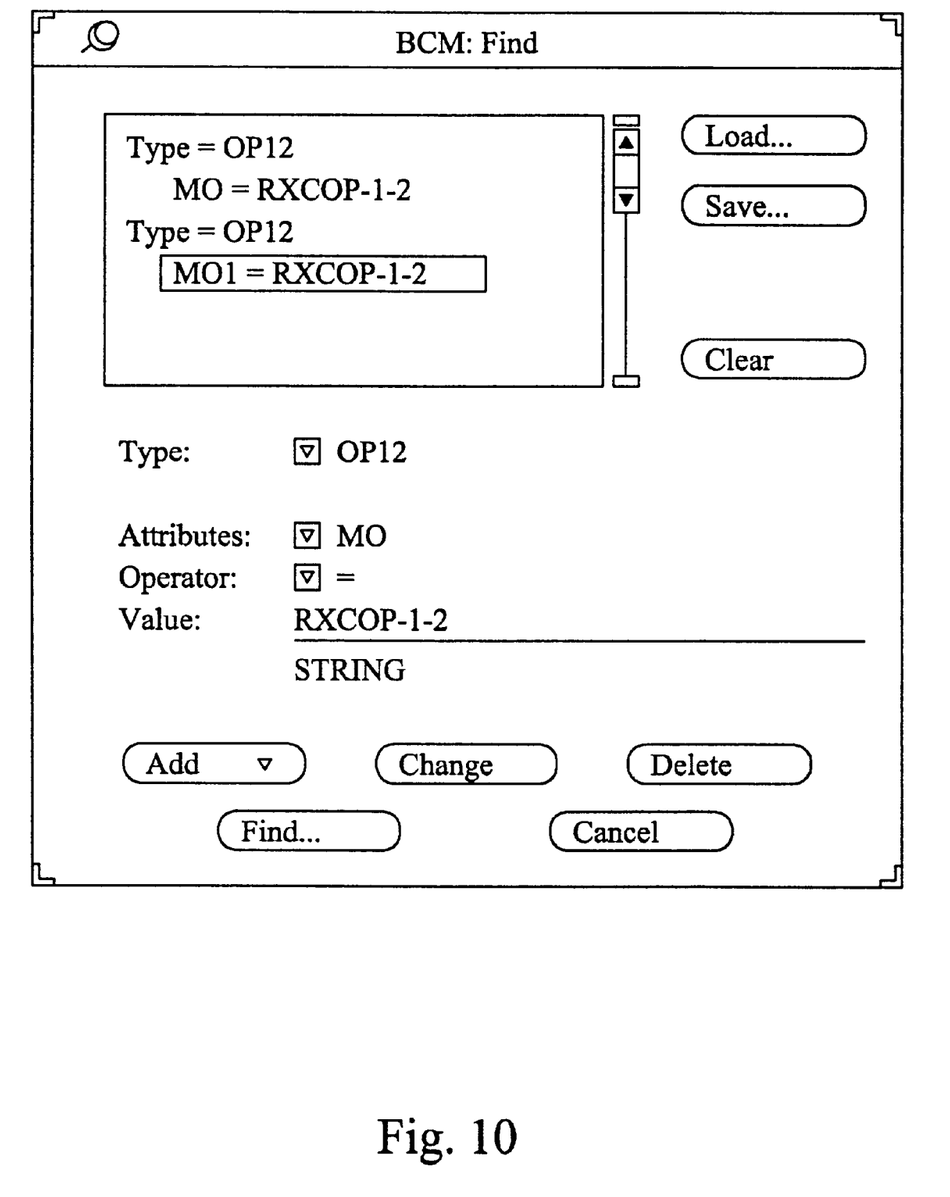
FIG. 10 is a pictorial view of a user interface window showing a search/query operation according to an exemplary embodiment of the present invention.

Referring to FIG. 11, the tree browser window 615 and the bucket window 500 interact in various ways. The first set of interactions occur when a new bucket 510 is created. Before the new bucket 510 is actually created, the portion of the tree data model 716 which is copied to the bucket data model 717 is selected. The user selects (highlights) the elements, e.g., managed objects 922, in the tree browser window 615 which the user wishes to place in a new bucket 510 and then selects a command which creates a new bucket 510 and a new bucket window 500. Alternatively, as illustrated in FIG. 10, a new bucket 510 can be created as the result of a search/query operation of the user according to specific user supplied criteria.

The above two options both include the creation of a bucket data model 717 which is independent of the tree data model 716. In an exemplary embodiment, the bucket data model 717 contains only the desired managed objects 522, whether user selected, or as a result of a search/query operation. The search/query operation can be achieved by any well known search technique, including boolean, keyword, and/or full text searches. In addition, a more complex search/query operation may be able to sort the tree data model 716 into a plurality of bucket data models 717 with associated views 511 based on certain user-defined criteria. In the context of a telecommunications management system, examples of search criteria may be for example, base stations, transmitters, location of equipment, object type, state, software version, corresponding cell or hardware, assigned technician, etc.

Of course, one skilled in the art will recognize that a search may find no elements. In such a case, an empty or null bucket and null bucket window may be created which displays no managed objects and contains an empty bucket data model 717. A user may create an empty bucket and then add managed objects 522 by any common data entry technique including key entry from a keyboard, mouse movement (drag-and-drop), voice commands, etc. For example, managed objects 522 from the tree browser window 615 or from an existing bucket window 500 can be selected and then dragged to the empty bucket window.

As stated above, the bucket data model 717 is independent of the tree data model 716, i.e., changes in the tree data model 716 do not affect the bucket data model 717 in any way. However, selections and changes made in a bucket window 500 can be forwarded as selections and changes in the tree browser 613, i.e., there exists a one-way communication from a bucket 510 back to the tree browser 613. This feature of the present invention can be used to enhance the user's ability to navigate and operate on objects in the tree.

For example, referring to FIGS. 5, 6, & 11, in an exemplary embodiment the user can select (highlight) some (or all) of the managed objects 522 using bucket controls 512 which are displayed in the bucket window 500, which selections can be copied back to the tree browser window 615. Thus, this exemplary embodiment allows the bucket windows 500 to serve as different selection containers which more readily allow a user to operate on groups of objects without having to find each object in the tree browser window 615.

This selection back-copy mechanism operates as if the user has selected the elements directly in the tree browser window 615. By selecting multiple managed objects 522, a single operation can then be selected to perform its task on all of the now selected managed objects 922 in the tree browser window 615 of the tree browser 613, e.g., all of the objects in a bucket 510 could have their states changed (e.g., operational, maintenance, or alarm state) or all of the objects in a bucket 510 could be deleted from the tree. On the other hand, directly selecting all desired managed objects 522 in the tree browser window 615 might be difficult due to the possible wide distribution of the managed objects 522 in the tree browser window 615. Using a bucket window 500 as an intermediate step for setting a selection makes it much easier to ensure that all and only the elements which should be selected are selected.

Three exemplary methods of copying a selection made in a bucket window 500 back to the tree browser window 615 are described below. First, the selection made in the bucket window 500 can be the exclusive selection in the tree browser window 615. That is, the tree browser window 615 will display to the user the selected managed object 922 in its appropriate hierarchical level according to the managed object naming tree 450. Alternatively, the selection made in a bucket window 500 can be added or subtracted to the selection(s) currently made in the tree browser window 615.

The latter type of copying gives the user the opportunity to combine different selections; i.e., from different bucket windows 500 into one selection in the tree browser window 615. It also makes it possible to perform some selections in the tree browser window 615 directly, and then add some selections from a bucket window 500 or multiple bucket windows 500. In all cases, the selection(s) finally made in the tree browser window 615 could then be used to create a new bucket window 500 via the aforementioned user bucket creation mechanism.

In an alternate embodiment of the present invention, several tree browser windows 615 are displayed to the user, thereby allowing the user to view different sections of the tree data model 716 at the same time. In this alternate embodiment, multiple tree browser windows 615 would all access the same tree data model 716. The synchronization mechanisms described above would also be available to the user in this embodiment. That is, selections made in the bucket views 511 of the bucket windows 500 could be copied back to one or multiple tree browser windows 615 based on user preference. An operation could then be performed on some or all of the selected objects, or each tree browser window 615 could be used to display the hierarchical relationship of each selected object.

In another alternate embodiment of the present invention, if multiple managed objects 522 are selected, a separate tree browser window 615 is displayed for each of the selected managed objects 522. This embodiment would allow the user to independently operate on multiple levels of the tree data model 716 without having to continually switch the view of a single tree browser window 615.

In an exemplary embodiment, the managed objects 522 displayed to the user in the bucket view 511 of the bucket window 500 are represented by text strings. When a user selects a managed object 522 in the bucket view 511 of the bucket window 500 of a bucket 510, a text search is performed on the managed object data model 716. When the managed object 522 is found, operations may then be performed on the managed object 522 as described above.

In an alternate embodiment of the present invention, the bucket data model 717 can be made up of pointers or references to the tree data model 716 as opposed to a static copy of the subset of the tree data model 716. In addition, the managed objects 522 can be text strings which are searched in the bucket data model 717, similarly to the text search described above. Alternatively, the managed objects 522 can be pointers or references to the bucket data model 717. These various structures create a two-way communication from the bucket 510 to the tree browser 613. In this alternate embodiment, selections and changes made to the tree data model 716 will be reflected in the existing bucket data model 717. In addition, selections and changes made to the existing bucket data model 717 will be reflected in the tree data model 716.

In an alternate embodiment of the present invention, bucket view 511 of bucket window 500 can display the bucket data model 716 as a tree list or any other known display format. In addition, a user or the application can select the most appropriate bucket view 511 for the display of the contents of the bucket data model. For example, if the bucket data model 717 represents a specific branch of the tree data model 716, the specific branch may be small enough to view all of the contents as a tree list in a single bucket view 511.

As stated above, changes can be made to the managed objects 522 contained in the managed object tree data model 716. These changes can be made from either a tree browser window 615 or a bucket window 500. The user can modify the managed objects 522 by any common data entry technique including key entry from a keyboard, mouse movement (drag-and-drop), voice commands, etc.

The present invention provides a better graphical user interface for applications such as telecommunication network management. The invention solves a key problem in visualizing many, e.g., thousands, of managed objects, for example in a graphical user interface used to manage a telecommunications network. The above described embodiments allow users to have a display of exactly those managed objects the user is currently working with, and at the same time still have the overview of where these managed objects belong in the managed object hierarchy.

The described embodiments of interworking and synchronizing between these two views ensures consistent displays and is also easily understandable for the user. The invention allows the user of applications such as telecommunication network management to work more efficiently since the user will always have an overview of the hierarchical relationship of managed objects in addition to the grouping of the managed objects the user is working with.

The invention has been described with reference to exemplary embodiments. However, it will be readily apparent to those skilled in the art that it is possible to embody the invention in specific forms other than those of the exemplary embodiments described above. This may be done without departing from the spirit of the invention. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A graphical user interface comprising:

at least one primary window displaying contents of a hierarchical data model as a hierarchical tree;

at least one secondary window data model including at least one subset of said contents of said hierarchical data model;

at least one secondary window displaying contents of said at least one secondary window data model as a flat list; and means for adding contents to said secondary window data model;

wherein said at least one primary window and said at least one secondary window are concurrently displayed; and wherein said at least one subset comprises at least two elements each having different immediate parent nodes in said hierarchical data model.

2. The system of claim 1 wherein said primary window includes a tree browser and said secondary window includes a bucket.

3. The system of claim 1 further comprising:

control means for expanding and collapsing hierarchical levels of said hierarchical tree.

4. The system of claim 1 wherein said graphical user interface displays information pertaining to the structure of a managed telecommunication network.

5. The system of claim 1 wherein said contents of said hierarchical data model include managed objects.

6. The system of claim 1 wherein contents of at least one secondary window are static.

7. The system of claim 1 wherein contents of at least one secondary window are dynamic.

8. The system of claim 1 further comprising:

means for copying selections made in said at least one secondary window to said hierarchical tree.

9. A method of operating a graphical user interface comprising the steps of:

displaying contents of a hierarchical data model as a hierarchical tree in at least one primary window;

simultaneously displaying contents of at least one secondary window data model in at least one secondary window as a flat list; and adding contents to said at least one secondary window data model;

wherein said at least one subset comprises at least two elements each having different immediate parent nodes in said hierarchical data model; and wherein said at least one secondary window data model includes at least one subset of said contents of said hierarchical data model.

10. The method of claim 9 wherein the steps of displaying and simultaneously displaying further comprise the step of:

displaying information pertaining to the structure of a managed telecommunication network.

11. The method of claim 9 wherein said step of displaying said contents of said hierarchical data model as a hierarchical tree further comprises the step of:

displaying a hierarchical list of managed objects.

12. The method of claim 9 wherein said method of operating a graphical user interface further comprises the step of:

changing said contents of said hierarchical data model via said at least one of said primary window or said at least one of said secondary window.

13. The method of claim 12 wherein said step of simultaneously displaying contents of said at least one secondary window data model further comprises the step of:

keeping said at least one secondary window data model static following said change in said hierarchical data model.

14. The method of claim 12 wherein said step of simultaneously displaying said contents of said at least one secondary window data model further comprises the steps of:

changing said display of said contents of said hierarchical data model in at least one primary window to match said changes made in said hierarchical data model.

15. The method of claim 9 wherein said method further comprises the steps of:

selecting at least one element in said at least one secondary window; and changing a display of at least one element in said at least one primary window to correspond to said selecting of said at least one element in said at least one secondary window, wherein said changing of said display indicates the hierarchical location of said at least one element in said hierarchical data model.

16. The method of claim 9 wherein said method further comprises the steps of:
   selecting a plurality of elements in said at least one secondary window;
   displaying separate primary windows for each of said plurality of elements; and
   changing said displays for each of said separate primary windows such that each of said separate primary windows indicate the hierarchical location of each of its respective elements in said hierarchical data model.

17. A method of manipulating a display associated with a hierarchical data model in a graphical user interface comprising the steps of:
   displaying at least one element of said hierarchical data model as a hierarchical tree in said at least one primary window;
   directly selecting from said display at least one element of said hierarchical data model in said at least one primary window;
   creating at least one secondary window data model including said at least one element;
   displaying said at least one element of said at least one secondary window data model in at least one secondary window as a flat list; and
   adding an additional at least one element to said at least one secondary window data model subsequent to the displaying step;
   wherein subsequent to the adding step, said secondary window data model comprises at least two elements each having different immediate parent nodes in said hierarchical data model.

18. The method of claim 17 wherein said at least one element displayed in said at least one primary window is a managed object.

19. The method of claim 17 wherein said method further comprises the step of:
   destroying said at least one secondary window and said at least one secondary window data model.

20. The method of claim 17 wherein said method further comprises the step of:
   storing said at least one secondary window data model in a storage medium.

21. The method of claim 20 wherein said method further comprises the step of:
   retrieving at least one secondary window data model from said storage medium.

22. A method of manipulating a display associated with a hierarchical data model in a graphical user interface having at least one primary window and at least one secondary window, said secondary window associated with a secondary window data model, said method comprising the steps of:
   displaying at least one element of said hierarchical data model in at least one primary window;
   performing a search of said hierarchical data model according to criteria;
   identifying a set of elements as a result of said search;
   adding said set of elements to said secondary window data model; and
   displaying at least one element of said secondary window data model in an existing at least one secondary window without deleting any prior existing elements of said secondary window data model.

23. The method of claim 22 wherein said step of displaying said at least one element of said secondary window data model further comprises the step of displaying said at least one element as at least one flat-list in said at least one secondary window.

24. The method of claim 22 wherein said set of elements is the empty set.

25. The method of claim 22 wherein said set of elements includes at least one managed object.

26. The method of claim 22 wherein said method further comprises the step of:
   destroying said at least one secondary window and said at least one secondary window data model.

27. The method of claim 22 wherein said method further comprises the step of:
   storing said at least one secondary window data model in a storage medium.

28. The method of claim 27 wherein said method further comprises the step of:
   retrieving at least one secondary window data model from said storage medium.

29. The method of claim 9 wherein said primary window includes a tree browser and said secondary window includes a bucket.

30. The method of claim 9 further comprising the steps of:
   selecting at least one element from a display of said contents of said hierarchical data model or a display of said contents of said at least one secondary data model;
   creating another at least one secondary window data model including said at least one element; and
   displaying contents of said another at least one secondary window data model in another at least one secondary window.

31. The method of claim 30 wherein said step of displaying said contents of said another at least one secondary window data model further comprises the step of displaying said contents as at least one flat-list in said another at least one secondary window.

32. The method of claim 9 wherein said method further comprises the step of:
   changing said contents of said at least one secondary window data model.

33. The method of claim 32 wherein said step of changing further comprises the step of:
   adding or removing elements to said at least one secondary window data model via a drag-and-drop operation performed on said at least one secondary window.

34. The method of claim 32 wherein said step of changing further comprises the step of:
   adding or removing elements to said at least one secondary window model.

35. The method of claim 32 wherein said step of changing further comprises the step of:
   editing an attribute of at least one of said contents of said at least one secondary window data model.

36. The method of claim 9 wherein said method further comprises the steps of:
   selecting at least one element in said at least one secondary window;
   causing said at least one element to be selected based upon said selection of said at least one element in said at least one primary window.

37. The method of claim 36 wherein said method further comprises the step of:
   selecting another at least one element in said at least one primary window.

38. The method of claim 36 wherein said method further comprises the step of:

executing an operation which is performed on said at least one element.

39. The method of claim 37 wherein said method further comprises the step of:

executing an operation which is performed on both said at least one element and said another at least one element.

40. The method of claim 9 wherein said method further comprises the steps of:

selecting at least one element in said at least one secondary window; and causing said at least one element to be an exclusive selection in said at least one primary window.

41. The method of claim 9 wherein said at least one primary window includes at least one existing selection of at least one element, said method further comprising the steps of:

selecting at least one element in said at least one secondary window; and causing said at least one element from said selecting step to be added to said at least one existing selection in said at least one primary window.

42. The method of claim 9 wherein said at least one primary window includes at least one existing selection of at least one element, said method further comprising the steps of:

selecting at least one element in said at least one secondary window; and causing said at least one element to be removed from said at least one existing selection in said at least one primary window.

43. The method of claim 9 wherein said contents of said hierarchical data model are displayed as icons.

44. A method of operating a graphical user interface comprising the steps of:

displaying contents of a hierarchical data model as a hierarchical tree in at least one primary window;

creating at least one secondary window data model;

selecting at least one of said contents of said hierarchical data model from said at least one primary window subsequent to the creating step;

adding said at least one of said contents from said selecting step to said at least one secondary window data model subsequent to the selecting step; and displaying contents of said secondary window data model in at least one secondary window as a flat list;

wherein following the completion of the adding step, said contents of said secondary window data model comprises at least two elements each having different immediate parent nodes in said hierarchical data model.

45. The method of claim 44 wherein said step of creating at least one secondary window data model creates at least one secondary window data model without any objects.

46. A method of operating a graphical user interface comprising the steps of:

displaying contents of a hierarchical data model as a hierarchical tree in at least one primary window; and simultaneously displaying at least one subset of said contents of said hierarchical data model in at least one secondary window;

changing said contents of said hierarchical data model via said at least one of said primary window or said at least one of said secondary window;

wherein said at least one subset comprises at least two elements each having different immediate parent nodes in said hierarchical data model; and wherein said step of simultaneously displaying said at least one subset of said contents of said hierarchical data model further comprises the step of keeping said at least one subset static following said change in said hierarchical data model.

* * * * *